United States Patent
Schmidt et al.

[15] 3,677,587
[45] July 18, 1972

[54] BALL JOINT FOR VEHICLE LINKAGES

[72] Inventors: Andreas Schmidt, Osterath-Bovert; Paul Muller, Dusseldorf-Oberkassel, both of Germany

[73] Assignee: A. Ehrenreich & Cie

[22] Filed: Sept. 22, 1970

[21] Appl. No.: 74,444

[30] Foreign Application Priority Data
Oct. 22, 1969 Germany ............. P 19 53 116.9

[52] U.S. Cl. ............................................. 287/87, 287/85 A
[51] Int. Cl. ............................................. F16c 11/06
[58] Field of Search .................. 287/87, 90 R190 C, 85 A

[56] References Cited

UNITED STATES PATENTS

| | | | |
|---|---|---|---|
| 3,089,718 | 5/1963 | Gottschald et al. | 287/90 R |
| 3,411,815 | 11/1968 | Sullivan, Jr. | 287/90 R |
| 3,008,743 | 11/1969 | Westercamp | 287/85 A |
| 3,554,586 | 1/1971 | Cutler | 287/87 |
| 3,375,028 | 3/1968 | Patton | 287/90 R |

*Primary Examiner*—Andrew V. Kundrat
*Attorney*—Arthur Schwartz

[57] ABSTRACT

A ball and socket joint including a bearing member in the joint housing, the bearing having a plurality of small protrusions on one end thereof. The protrusions may be flattened during assembly to compensate for tolerances in production.

7 Claims, 3 Drawing Figures

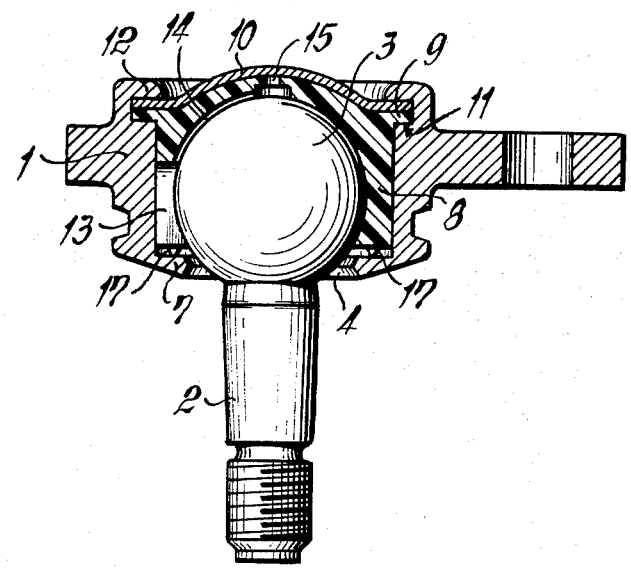
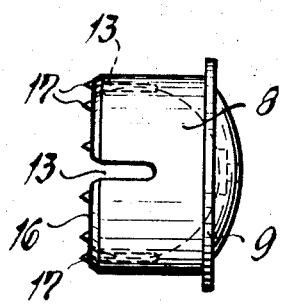
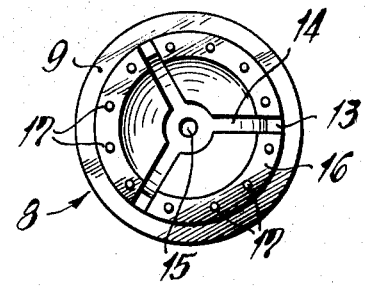
INVENTOR
ANDREAS SCHMIDT,
PAUL MULLER
BY: Arthur Schwartz
ATTORNEY

BALL JOINT FOR VEHICLE LINKAGES

BACKGROUND OF THE INVENTION

1. Field of the Invention

The invention relates to ball joints, and in particular to ball joints for use in motor vehicles, preferably in their steering linkage. A hard bearing member for the bearing support of the ball element on a joint pin is clamped inside the joint housing in the direction of the pin axis, with one end face of the bearing member abutting against a shoulder surface inside the housing.

2. Description of the Prior Art

Known ball joints of the above type have had the shortcoming that, due to production tolerances of the joint housing which amount to about 0.2 millimeters, problems may arise as a result of length variations in the clamping distance. This will vary the pressure applied by the bearing against the ball element, causing in turn variations in the ease of movement of the assembled ball joints, as well as uncontrollable movement of the ball joints.

SUMMARY OF THE INVENTION

The basic objective underlying the present invention is to provide a ball joint wherein a wide range of relative movement is avoided. This is done by providing means to compensate for the effect of the production tolerances during clamping.

The above objective is attained by means of a bearing member having on its open-ended mounting face a plurality of small bead-like protrusions, the height of which are in excess of the production tolerances of the joint housing. They are capable of being flattened or squeezed under the pressure holding the socket face against the body shoulder, so as to compensate for the tolerance variations obtained during assembly of the individual ball joints.

The invention thus achieves the result that, independently of the production tolerances, the contact between the bearing and the ball is maintained consistent in all cases. Any excess above a desired value in the clamping pressure, or the pressure exerted on the bearing during the assembly operation, causes the protrusions to be flattened or squeezed.

In principle, the bearing member may be of any suitably hard material including steel. It is preferable, however, to use for this purpose a plastic material of sufficient hardness, such as acetate resin.

In a preferred embodiment, the bearing member has the shape of an outwardly extending cylindrical plug with a hollow spherical cavity and a peripheral flange. The flange abuts against an interior shoulder created by an enlarged diameter portion in the housing bore at its opening. The flange and shoulders thus determine the position of the bearing member inside the joint housing.

It is recommended to position the bead-like protrusions on the bearing member face at a distance from both the inner and outer peripheries of the face. This assures that the protusion material which is squeezed does not create any additional radial pressure against the ball.

BRIEF DESCRIPTION OF THE DRAWING

In the accompanying drawing is illustrated, by way of an example, an embodiment of the invention, represented in the various figures as follows:

FIG. 1 shows a vertical cross-section of a ball joint embodying the invention;

FIG. 2 is an exterior side view of the bearing member of FIG. 1; and

FIG. 3 shows the same bearing member in an end view from below.

DETAILED DESCRIPTION OF THE PREFERRED EMBODIMENT

In the embodiment shown in FIG. 1 the ball joint has a joint housing 1 which may be produced by drop-forging. Inside the housing 1 is supported a ball element 3 on a joint pin 2. The pin 2 extends from the joint housing 1 through a passage 4. The ball joint housing and pin may obviously have different shapes from that shown in the drawing.

The joint housing bore of the ball joint shown includes, at the end where the joint pin 2 extends outwardly from the housing, an interior support shoulder 7.

A bearing member 8 is positioned inside the housing bore by insertion through the housing opening opposite the side of the pin passage 4. This bearing member has a cylindrical exterior outline and is made of a plastic material of sufficient hardness such as acetate resin. On its closed side the bearing member 8 has a peripheral flange 9 and is covered by a cover plate 10. The peripheral flange 9 of the bearing member rests on an interior shoulder 11 of the joint housing which is formed by an enlarged-diameter portion in the housing bore. In the assembly operation, an upwardly directed edge 12 of the housing 1 is crimped over the outer edge of the cover plate which overlies the bearing flange 9.

The bearing member 8 has in its cylindrical portion a plurality of slots 13 extending from its open-end face on the end where the joint pin 2 passes through the joint housing 1. In addition, a number of lubricating grooves 14 are provided on the inside of the hollow spherical bearing member 8, the grooves 14 leading to an apex bore 15. The cover plate 10 may include a grease nipple (not shown in the drawing).

As can be seen from FIGS. 2 and 3, the bearing member 8 has a cylindrical shape and includes on its open-end face 16 a plurality of small bead-like protrusions 17. The height of these protrusions may be about 0.2 millimeters. Depending upon the individual height variations of the joint housing 1 within the given production tolerance, these protrusions 17 are flattened or squeezed when the housing edge 12 is rolled over the edge of the cover plate 10 during assembly. The bearing face 16 is thus forced against the interior shoulder 7 and holds the bearing member 8 with a desired consistent contact pressure against the ball element 3, regardless of the individual length dimension of the joint housing 1.

As can be seen from FIG. 3, the protrusions 17 are arranged at a distance approximately midway between the inner and outer peripheries of the bearing face 16.

We claim:

1. A ball and socket joint comprising:
   a. a joint housing having an opening therein,
   b. a ball element positioned in said housing,
   c. a joint pin on said ball member and extending outwardly of said joint housing through said opening,
   d. a hard bearing member in said joint housing surrounding at least a portion of said ball element,
   e. a transverse shoulder on said joint housing defining said opening,
   f. said bearing member having an end portion with a substantially planar end face thereon, said bearing member having a plurality of small bead-like axially extending protrusions projecting from said end face and abutting against said shoulder whereby said protrusions are capable of being flattened when during assembly sufficient pressure is exerted on said bearing member.

2. A ball and socket joint as defined in claim 1 wherein said bearing member is made of hard plastic material.

3. A ball and socket joint as defined in claim 2 wherein said plastic material is an acetate resin.

4. A ball and socket joint as defined in claim 1 wherein said bearing member is cylindrical in shape with a spherically shaped cavity for receiving said ball element.

5. A ball and socket joint as defined in claim 4 wherein said bearing member has a peripheral flange abutting against a shoulder in said joint housing.

6. A ball and socket joint as defined in claim 1 wherein said bearing member has a plurality of slots in the end adjacent said protusions.

7. A ball and socket joint comprising:
   a. joint housing having an opening therein,
   b. a ball element positioned in said housing, c. a joint pin on said ball member and extending outwardly of said joint housing through said opening,
d. a hard bearing member in said joint housing surrounding at least a portion of said ball element,
e. a shoulder on said joint housing adjacent said opening,
f. said bearing member having an end portion with an end face thereon, said bearing member having a plurality of small bead-like protrusions positioned on said end portion at a distance from both the interior and exterior peripheries of the end face, and abutting against said shoulder whereby said protrusions are capable of being flattened when during assembly sufficient pressure is exerted on said bearing member.

* * * * *